(12) United States Patent
Erickson et al.

(10) Patent No.: US 12,204,446 B2
(45) Date of Patent: Jan. 21, 2025

(54) COMPRESSION VIA DEALLOCATION

(71) Applicant: Rambus Inc., San Jose, CA (US)

(72) Inventors: Evan Lawrence Erickson, Chapel Hill, NC (US); Christopher Haywood, Cary, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/140,441

(22) Filed: Apr. 27, 2023

(65) Prior Publication Data

US 2023/0359554 A1 Nov. 9, 2023

Related U.S. Application Data

(60) Provisional application No. 63/339,640, filed on May 9, 2022.

(51) Int. Cl.
*G06F 12/02* (2006.01)
*G06F 12/0891* (2016.01)

(52) U.S. Cl.
CPC ...... *G06F 12/0292* (2013.01); *G06F 12/0891* (2013.01); *G06F 2212/401* (2013.01)

(58) Field of Classification Search
CPC ............ G06F 12/0292; G06F 12/0291; G06F 2212/401
See application file for complete search history.

(56) References Cited

U.S. PATENT DOCUMENTS

| | | | |
|---|---|---|---|
| 10,515,019 B1 | 12/2019 | Iyigun et al. | |
| 10,713,177 B2 | 7/2020 | Neiger et al. | |
| 2003/0014667 A1 | 1/2003 | Kolichtchak | |
| 2012/0246436 A1* | 9/2012 | Wang | G06F 12/109 711/170 |
| 2015/0293840 A1 | 10/2015 | Chen et al. | |
| 2018/0060250 A1 | 3/2018 | Hildesheim et al. | |
| 2021/0157497 A1* | 5/2021 | Tsirkin | G06F 9/45558 |

FOREIGN PATENT DOCUMENTS

WO WO-97/23828 A1 7/1997

* cited by examiner

*Primary Examiner* — Edward J Dudek, Jr.
(74) *Attorney, Agent, or Firm* — The Neudeck Law Firm, LLC

(57) ABSTRACT

A buffer/interface device of a memory node reads a block of data (e.g., page). As each unit of data (e.g., cache line sized) of the block is read, it is compared against one or more predefined patterns (e.g., all 0's, all 1's, etc.). If the block (page) is only storing one of the predefined patterns, a flag in the page table entry for the block is set to indicate the block is only storing one of the predefined patterns. The physical memory the block was occupying may then be deallocated so other data may be stored using those physical memory addresses.

20 Claims, 13 Drawing Sheets

IDENTIFY THAT A FIRST BLOCK OF PHYSICAL MEMORY IS ONLY STORING A PLURALITY OF COPIES OF A FIRST DATA PATTERN
202

BASED ON THE FIRST BLOCK OF PHYSICAL MEMORY ONLY STORING A PLURALITY OF COPIES OF THE FIRST DATA PATTERN, DEALLOCATING THE FIRST BLOCK OF PHYSICAL MEMORY
204

BASED ON THE FIRST BLOCK OF PHYSICAL MEMORY ONLY STORING A PLURALITY OF COPIES OF THE FIRST DATA PATTERN, SETTING A FIRST INDICATOR IN A PAGE TABLE TO INDICATE THAT READ ACCESSES ADDRESSED TO THE FIRST BLOCK OF PHYSICAL MEMORY SHOULD BE PROVIDED THE FIRST DATA PATTERN
206

*FIG. 2*

COMPRESSION VIA DEALLOCATION

BRIEF DESCRIPTION OF THE DRAWINGS

FIG. 2 is a flowchart illustrating a method of compressing the contents of a block of memory.

DETAILED DESCRIPTION OF THE EMBODIMENTS

Figure 1A:
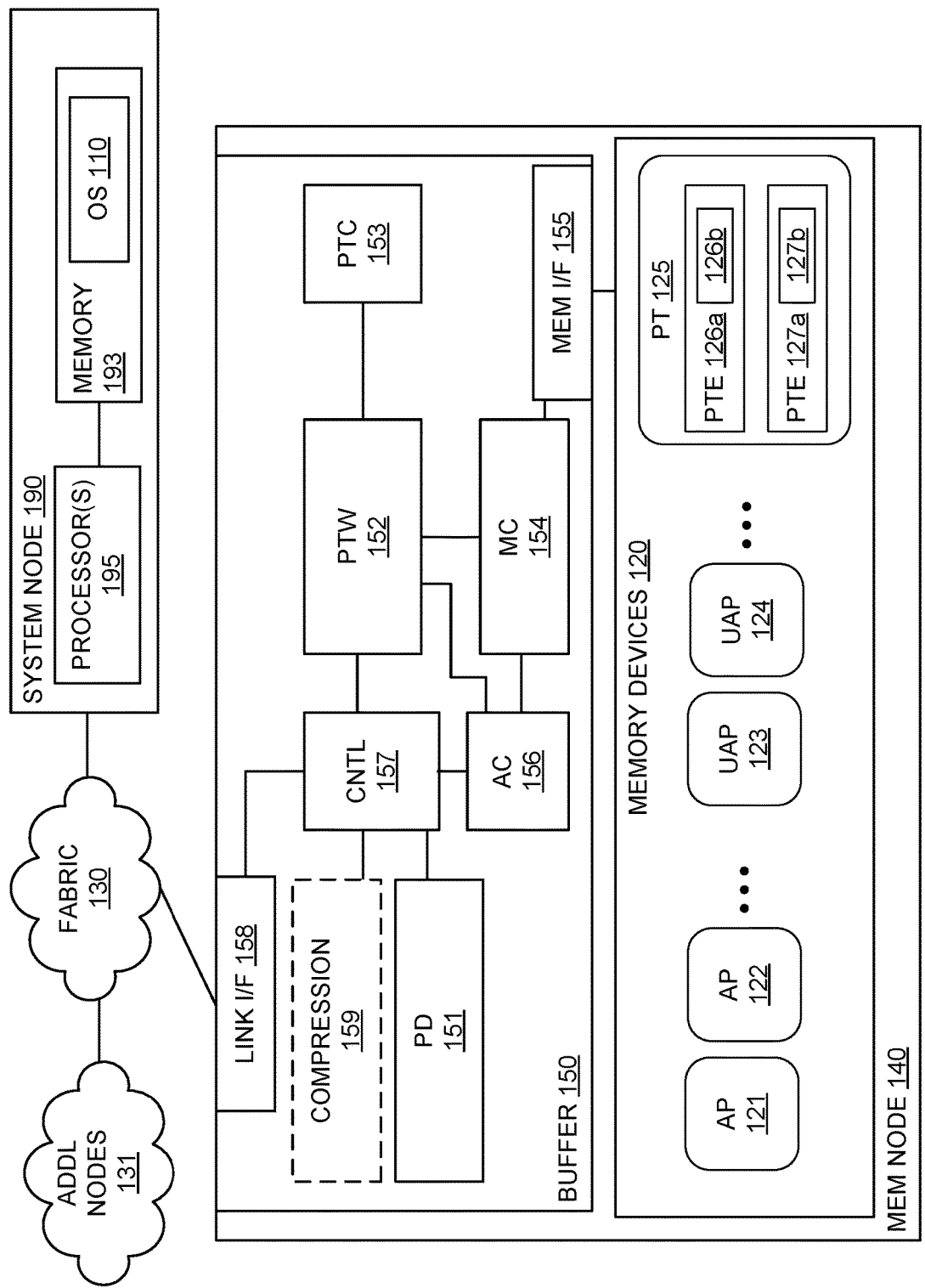
FIGS. 1A-1E are illustrations of a system that can compress memory contents.

In an embodiment, a memory node receives host physical addresses for accesses. In other words, addresses that are tied to the host's perception of physcal memory and associated memory map. A memory node, however, may not conform to the host's perception and/or memory map. This can allow the memory node to more efficiently manage its physical memory by, for example, arranging and rearraging physical memory pages held by the node, compressing pages, etc.

A memory node may maintain a map that relates host physical addresses to the device physical addresses used to address the memory devices on the memory node. This map may be referred to as a memory node page table. A memory node page table may have multiple levels and function similar to the virtual address to physical address translation page tables used by central processing units (CPUs). The memory node page table entries may also contain additional information about associated pages and/or groups of pages. However, a memory node page table's mappings of host physical addresses to memory node device addresses may be private to the memory node and may function entirely without the host's knowledge of the contents of the memory node page table. Thus, it should be understood that references made herein to "page table" and "page table entry" are referring to the mappings and associated data structures generated and maintained by the memory node and not to the virtual to physical address translation page tables maintained and used by the host.

A buffer/interface device of the memory node reads a block of data (e.g., page). As each unit of data (e.g., cache line sized) of the block is read, it is compared against one or more predefined patterns (e.g., all 0's, all 1's, etc.). If the block (page) is only storing one of the predefined patterns, a flag in the page table entry for the block is set to indicate the block is only storing one of the predefined patterns. The physical memory the block was occupying may then be deallocated so other data may be stored using those physical memory addresses.

In an embodiment, when a read to the block occurs, the buffer device reads the page table entry and if the flag is set, responds with the predefined pattern without having to access physical memory devices. When a write to the block occurs and the flag is set in the page table entry, the buffer device determines whether the write data matches the predefined pattern. If the write data matches the predefined pattern, and the flag is set, the buffer may avoid accessing the physical memory devices. If the write data does not match the predefined pattern, and the flag is set, the buffer allocates a new block (page), configures the new block with the predefined pattern, and writes the data to the new block.

FIGS. 1A-1E are illustrations of a system that can compress memory contents. In FIGS. 1A-1E, system 100 comprises system node 190, fabric 130, additional nodes 131, and memory node 140. System node 190 includes processor (s) 195, and local processor memory 193. Local processor memory 193 may store an operating system 110 that is executing on one or more processors 195. Memory node 140 includes buffer device 150, and memory devices 120. The contents residing in memory devices 120 includes allocated pages 121-122, unallocated pages 123-124, and page table 125. Page table 125 may include page table entries 126a-127a. Page table entries 126a-127a may include pattern flag 126b-127b, respectively. Page table entry 126a may be associated with allocated page 121. Page table entry 127a may be associated with allocated page 122.

System node 190, memory node 140, and additional nodes 131 are operatively coupled to fabric 130. System node 190, memory node 140, and additional nodes 131 are operatively coupled to fabric 130 to communicate and/or exchange information etc. with each other. Fabric 130 may be or comprise a switched fabric, point-to-point connections, and/or other interconnect architectures (e.g., ring topologies, crossbars, etc.) Fabric 130 may include links, linking, and/or protocols that are configured to be cache coherent. For example, fabric 130 may use links, linking, and/or protocols that include functionality described by and/or are compatible with one or more of Compute Express Link (CXL), Coherent Accelerator Processor Interface (CAPI), and Gen-Z standards, or the like. In an embodiment, system node 190, memory node 140, and additional nodes 131 are operatively coupled to fabric 130 to request and/or store information from/to that resides within other of system node 190, memory node 140, and/or additional nodes 131. In an embodiment, additional nodes 131 may include similar or the same elements as system node 190, and/or memory node 140 and are therefore, for the sake of brevity, not discussed further herein with reference to FIGS. 1A-1E.

In an embodiment, buffer device 150 includes page table walker (PTW) 152, page table control 153, memory controller 154, memory interface 155, allocation control 156, control circuitry 157, link control 158, and link interface 158. Page table walker 152 is operatively coupled to page table control 153, memory controller 154, allocation control 156, and control circuitry 157. Memory controller is operatively coupled to memory interface 155. Memory interface 155 is operatively coupled to memory devices 120. Memory interface 155 is configured to access at least one of memory devices 120 to access allocated pages 121-122, unallocated pages 123-124, and page table 125 stored by memory devices 120.

Control circuitry 157 is operatively coupled to page table walker 152, allocation control 156 and link control 158. Link control 158 is operatively coupled to link interface 158. Link interface 158 is operatively coupled to fabric 130. Link interface 158 is operatively coupled to fabric 130 to receive, from processor 195 executing operating system 110, access requests (e.g., reads and writes).

Access requests transmitted by system node 190 may include read requests (e.g., to read a cache line sized block of data) and write requests (e.g., to write a cache line sized block of data). In an embodiment, to respond to the read or write request, buffer device 150 (and PTW 152, in particular) may perform a page table walk to relate the addressed received from processor 195 to a physical address that is used by memory devices 120 (e.g., to address a cache line in an allocated page 121-122).

Figure 1B:
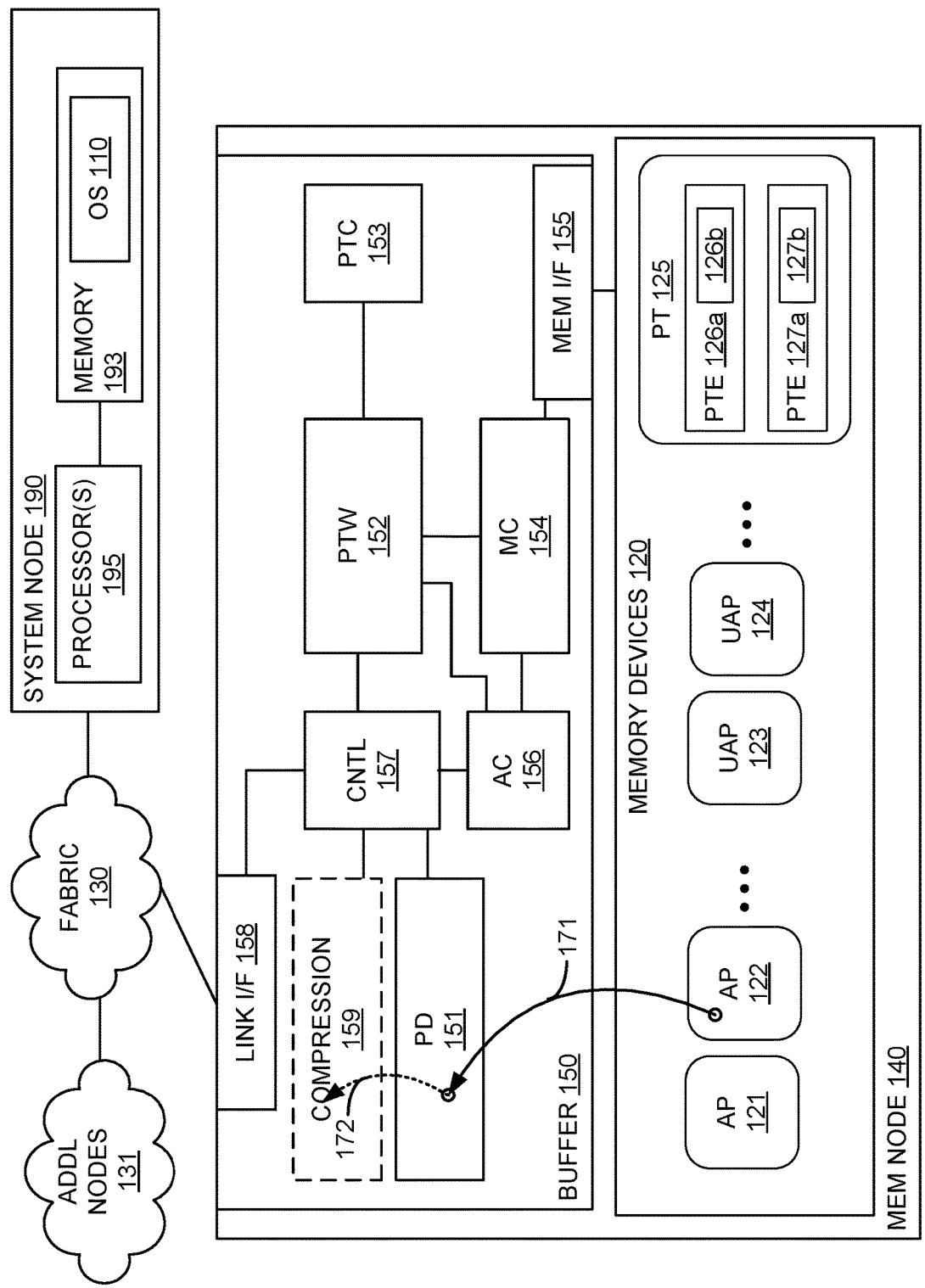

In an embodiment, an allocated page (e.g., allocated page 122) may be selected for compression. When a page is compressed, all of the cache line sized blocks of data in the selected page 122 are read from memory devices 120 and streamed into pattern detection circuitry 151 (and optionally, if present, to compression circuitry 159.) This is illustrated in FIG. 1B by arrow 171 running from allocated page 122 to pattern detection circuitry 151 and by arrow 172 running from pattern detection circuitry 151 to compression circuitry 159. pattern detection circuitry 151 compares each cache line sized block of data in the selected page 122 to one or more predefined patterns (e.g., all zeros). If all of the cache line sized blocks in the selected page 122 match the predefined pattern, compression of the page by compression circuitry may be halted.

Figure 1C:
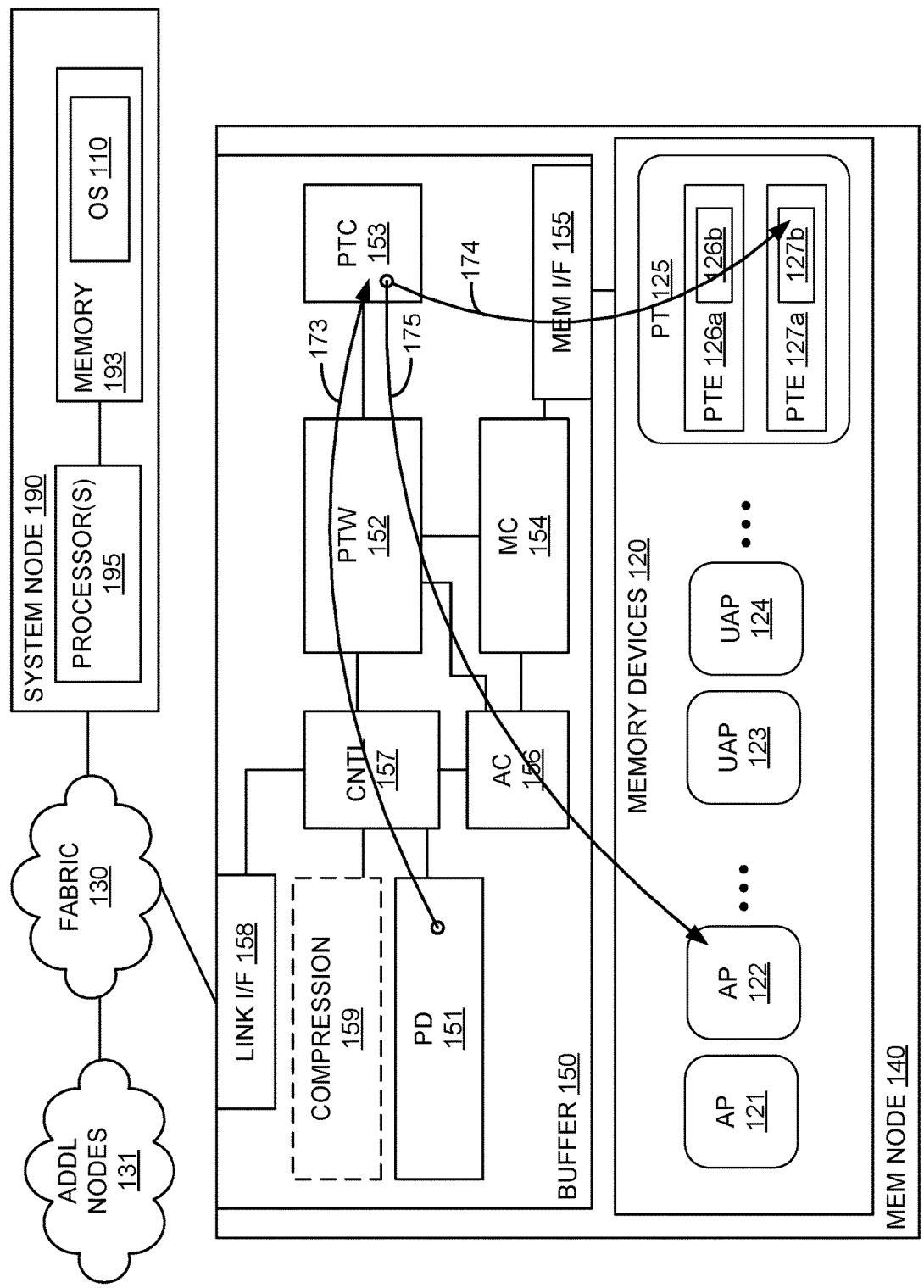

When pattern detection circuitry 151 determines that all of the cache line sized blocks in the selected page 122 match the predefined pattern, pattern detection circuitry 151 indicates this to page table control 153. This is illustrated in FIG. 1C by arrow 173 running from pattern detection circuitry 151 to page table control 153. In response to the indicator from pattern detection circuitry 151, page table control sets pattern flag 127b in the page table entry 127a corresponding to the selected page 122. This is illustrated in FIG. 1C by arrow 174 running from page table control 153 to pattern flag 127b in page table entry 127a. The pattern flag 127b indicates that all of the cache line sized blocks in the selected page 122, which is associated with the page table entry 127a, are storing the predefined pattern. Thus, buffer device 150 may respond to read requests to the selected page 122 with the predefined pattern without actually accessing the selected page 122.

Figure 1D:
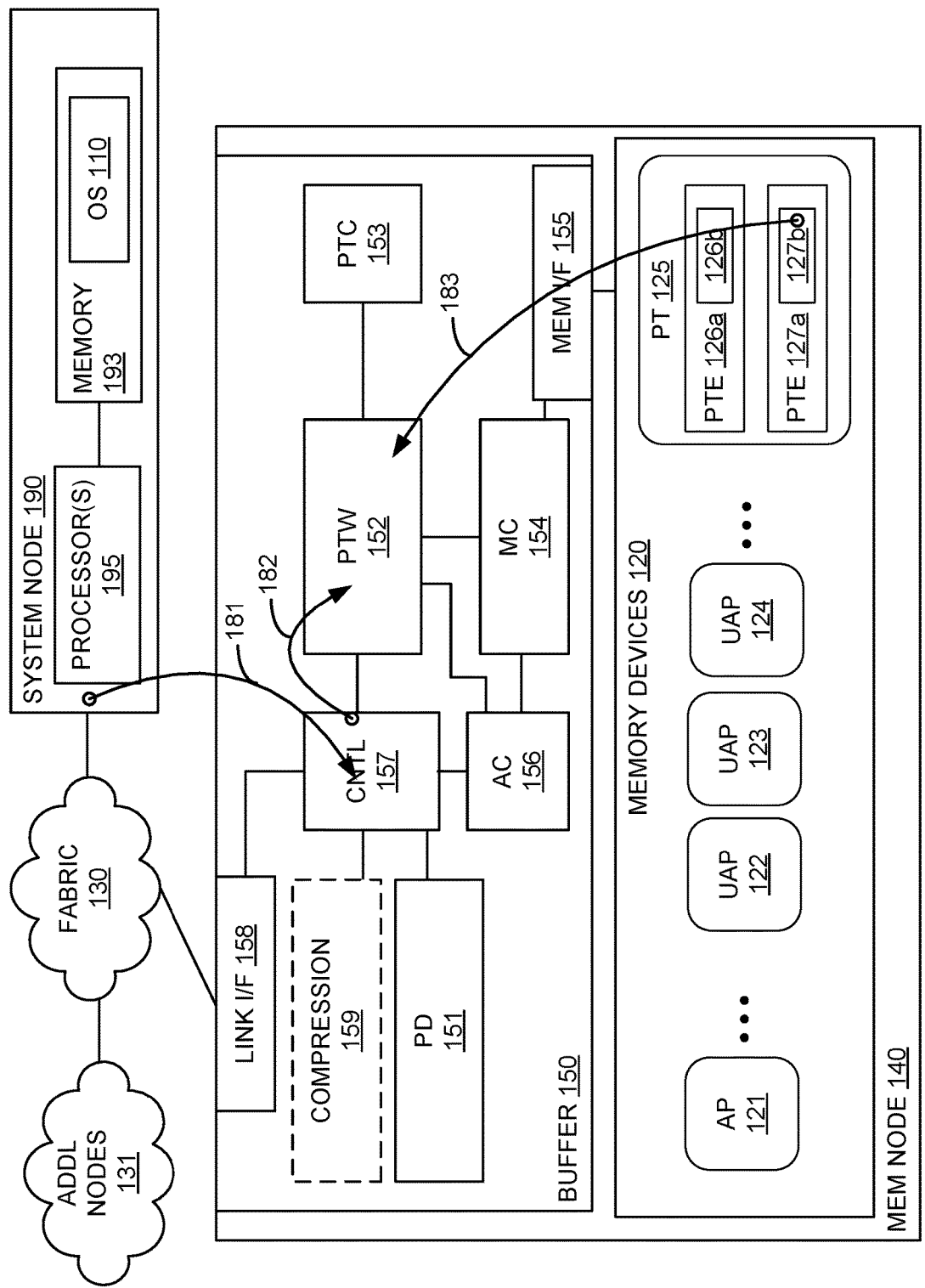
Figure 1E:
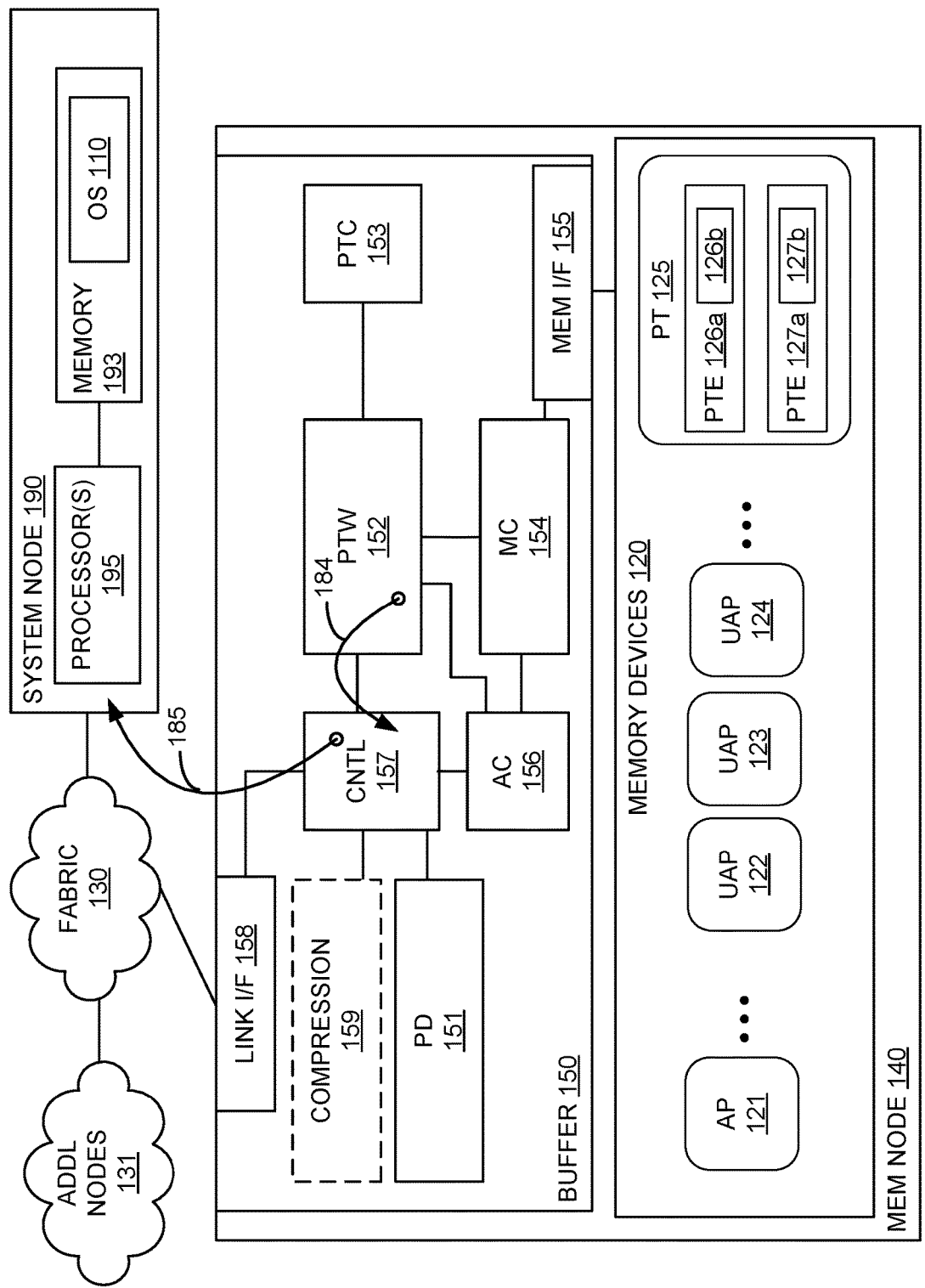

In an embodiment, once the pattern flag 127b is set for the selected page 122, selected page 122 may be deallocated. This is illustrated in FIG. 1C by arrow 175 running from page table control 153 to allocated page 122. This is also illustrated in FIGS. 1D-1E by the unallocated page label (UAP) on the box for page 122.

When system node 190 transmits a read request directed to page 122, control circuitry 157 causes page table walker 152 to walk page table 125 for the page table entry 127a associated with the address range of page 122. This is illustrated in FIG. 1D by arrow 181 running from system node 190 to control circuitry 157 and arrow 182 running from control circuitry 157 to page table walker 152. When page table walker 152 reads page table entry 127a, pattern flag 127b is also read. This is illustrated in FIG. 1D by arrow 183 running from pattern flag 127b to page table walker 152.

Page table walker 152 may provide an indicator that pattern flag 127b was set to control circuitry 157. This is illustrated in FIG. 1E by arrow 184 running from page table walker 152 to control circuitry 157. In response to the provide an indicator that pattern flag 127b was set, control circuitry 157 provides the pattern in response to the read request that was directed to page 122. This is illustrated in FIG. 1E by arrow 185 running from control circuitry 157 to system node 190. Note that memory devices 120 were accessed for page table walking and page table entry 127a, but were not accessed for the contents of page 122.

In FIGS. 1A-1E, page table 125 is depicted as residing in the same memory devices 120 as allocated pages 121-122 and unallocated pages 123-124. However, this is merely one embodiment selected for illustration purposes. Page table 125 may reside in other memory. For example, all or parts of page table 125 may reside in dedicated memory device(s) (e.g., dedicated SRAM), in memory in buffer 150, and/or in a page table cache in buffer 150.

FIG. 2 is a flowchart illustrating a method of compressing the contents of a block of memory. One or more steps illustrated in FIG. 2 may be performed by, for example, system 100, and/or its components. It is identified that a first block of memory is only storing a plurality of copies of a first data pattern (202). For example, all of the cache line sized blocks of data in the page 122 may be read from memory devices 120 and streamed into pattern detection circuitry 151. Pattern detection circuitry 151 compares each cache line sized block of data in page 122 to one or more predefined patterns (e.g., all zeros). If pattern detection circuitry 151 determines that all of the cache line sized blocks in page 122 match the predefined pattern, pattern detection circuitry 151 may indicates this to control circuitry 157 and/or page table control 153.

Based on the first block of physical memory only storing a plurality of copies of the first data pattern, the first block of physical memory is deallocated (204). For example, based on pattern detection circuitry 151 determining that all of the cache line sized blocks in page 122 match the predefined pattern, buffer device 150 (e.g., page table control 153, in particular) may deallocate page 122. Based on the first block of physical memory only storing a plurality of copies of the first data pattern, setting a first indicator in a page table to indicate that read accesses addressed to the first block of physical memory should be provided the first data pattern (206). For example, based on pattern detection circuitry 151 determining that all of the cache line sized blocks in page 122 match the predefined pattern, buffer device 150 (e.g., page table control 153, in particular) may set pattern flag 122b in the page table entry 127a associated with page 122 that will indicate to control circuitry 157 that the first pattern should be provided in response to read requests from system node 190 that are directed to page 122.

Figure 3:
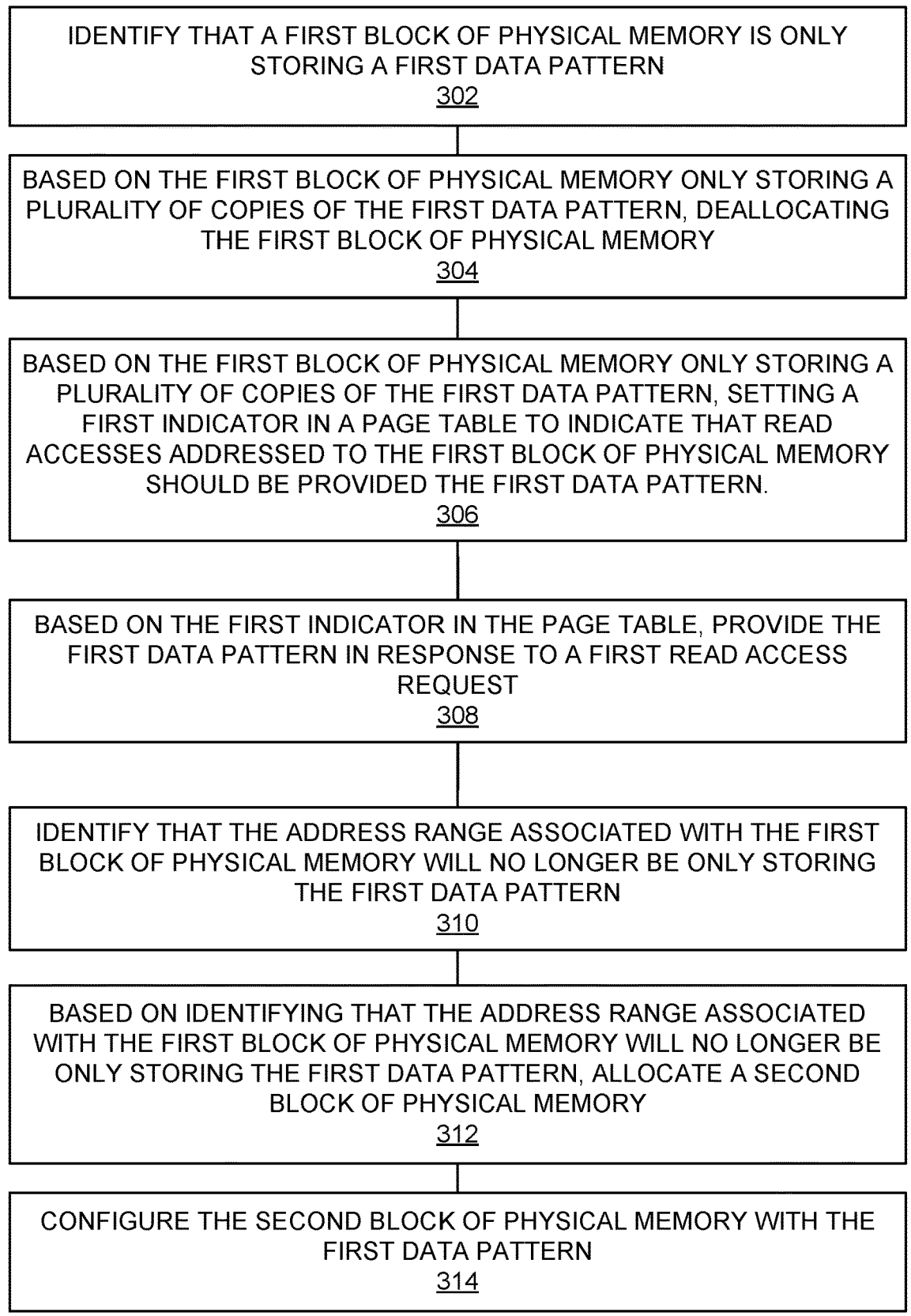
FIG. 3 is a flowchart illustrating a method of compressing/decompressing the contents of a block of memory.

FIG. 3 is a flowchart illustrating a method of compressing/decompressing the contents of a block of memory. One or more steps illustrated in FIG. 3 may be performed by, for example, system 100, and/or its components. It is identified that a first block of memory is only storing a plurality of copies of a first data pattern (302). For example, all of the cache line sized blocks of data in the page 122 may be read from memory devices 120 and streamed into pattern detection circuitry 151. Pattern detection circuitry 151 compares each cache line sized block of data in page 122 to one or more predefined patterns (e.g., all zeros). If pattern detection circuitry 151 determines that all of the cache line sized blocks in page 122 match the predefined pattern, pattern detection circuitry 151 may indicates this to control circuitry 157 and/or page table control 153.

Based on the first block of physical memory only storing a plurality of copies of the first data pattern, the first block of physical memory is deallocated (304). For example, based on pattern detection circuitry 151 determining that all of the cache line sized blocks in page 122 match the predefined pattern, buffer device 150 (e.g., page table control 153, in particular) may deallocate page 122. Based on the first block of physical memory only storing a plurality of copies of the first data pattern, setting a first indicator in a page table to indicate that read accesses addressed to the first block of physical memory should be provided the first data pattern (306). For example, based on pattern detection circuitry 151 determining that all of the cache line sized blocks in page 122 match the predefined pattern, buffer device 150 (e.g., page table control 153, in particular) may set pattern flag 122b in the page table entry 127a associated with page 122 that will indicate to control circuitry 157 that the first pattern should be provided in response to read requests from system node 190 that are directed to page 122.

Based on the first indicator in the page table, the first data pattern is provided in response to a first read access request (308). For example, based on pattern flag 127b in page table entry 127a being set to indicate that page 122 only stores cache line sized blocks that are the predefined pattern, control circuitry 157 may return to system node 190 the predefined pattern in response to a read request directed to page 122.

It is identified that the address range associated with the first block of physical memory will no longer be only storing the first data pattern (310). For example, control circuitry 157 may identify a write request from system node 190 directed to page 122 that is not writing the predefined data pattern to page 122. Based on identifying that the address range associated with the first block of physical memory will no longer be only storing the first data pattern, a second block of physical memory is allocated (312). For example, based on control circuitry 157 identifying a write request from system node 190 directed to page 122 that is not writing the predefined data pattern to page 122, buffer device 150 (e.g., page table control 153, in particular) may allocate page 124. The second block of physical memory is configured with the first data pattern (314). For example, buffer device 150 may perform the write that was not the predefined data pattern to page 124 and then write the predefined data pattern to all of the other cache line sized blocks in page 124 (or vice versa).

Figure 4:
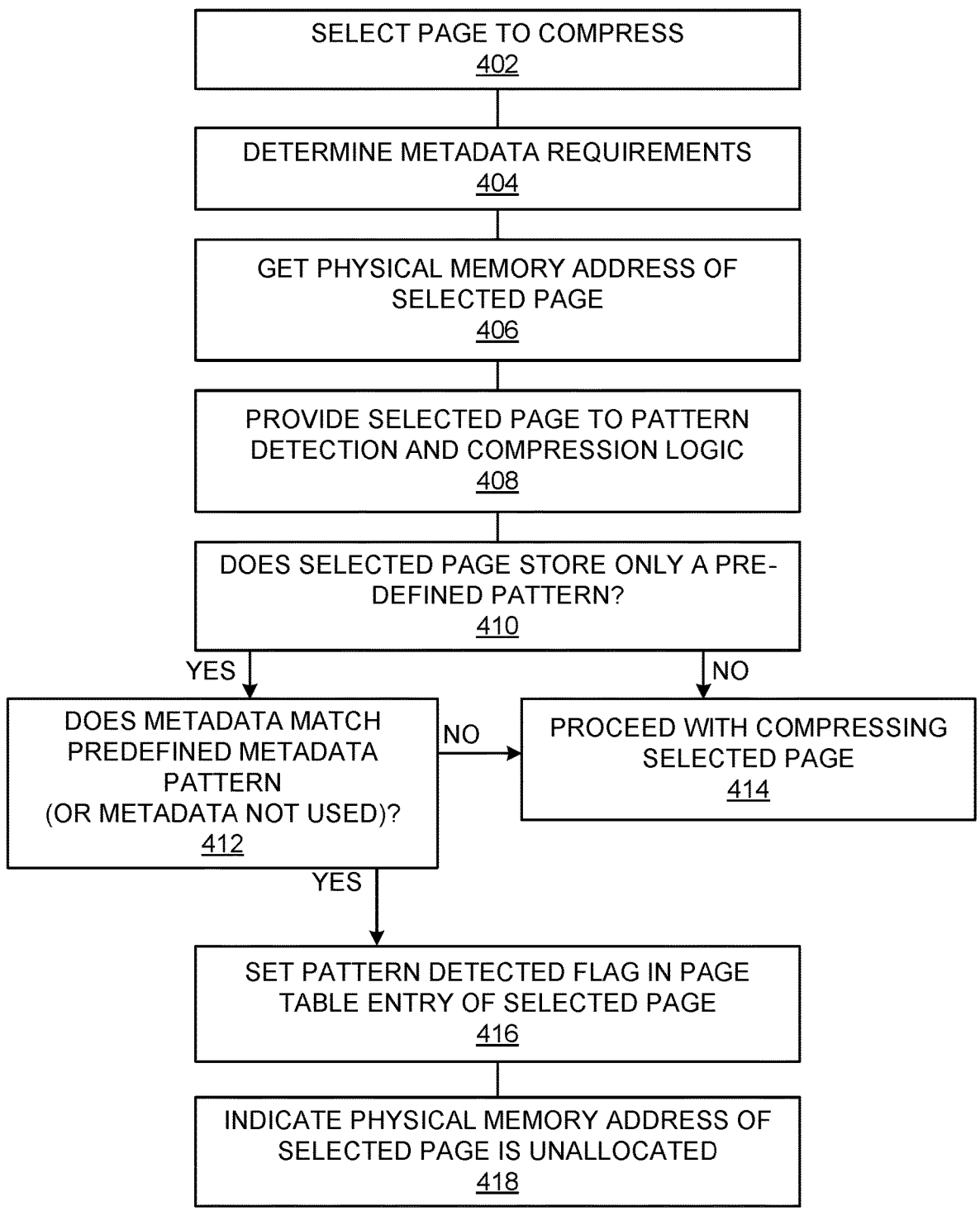
FIG. 4 is a flowchart illustrating a method of compressing the contents of a block of memory.

FIG. 4 is a flowchart illustrating a method of compressing the contents of a block of memory. One or more steps illustrated in FIG. 4 may be performed by, for example, system 100, and/or its components. A page is selected to compress (402). For example, system node 190 may select a logical address that resolves to page 122 for compression by compression circuitry 159. Metadata requirements are determined (404). For example, control circuitry 157 may determine that the cache line sized blocks of data in page 122 also include metadata that should be included in the predefined pattern matching search by pattern detection circuitry 151.

Get physical memory address of selected page (406). For example, page table walker 152 may walk page table 125 to determine the physical address (i.e., the address to be presented to memory devices 120) of page 122 from the page table entry 127a associated with page 122.

The selected page is provided to pattern detection and compression logic (408). For example, the contents of page 122 may be provided to pattern detection circuitry 151 and compression circuitry. If the selected page only stores a predefined pattern, flow proceeds to block 412. If the selected page does not only store the predefined pattern, flow proceeds to block 414 (410). If the metadata matches the predefined metadata pattern (or metadata is not used), flow proceeds to block 416. If the metadata does not match the predefined metadata pattern, flow proceeds to block 414. In block 414, the selected page is compressed (414). For example, compression circuitry may compress page 122.

In block 416, the pattern detected flag in the page table entry of the selected page is set (416). For example, page table control 153 may set pattern flag 127b that is in page table entry 127a which is associated with page 122. The physical memory address of the selected page is indicated to be unallocated (418). For example, control circuitry 157 may indicate (e.g., by placing on a "free" list) that the physical address range associated with page 122 is unallocated.

Figure 5:
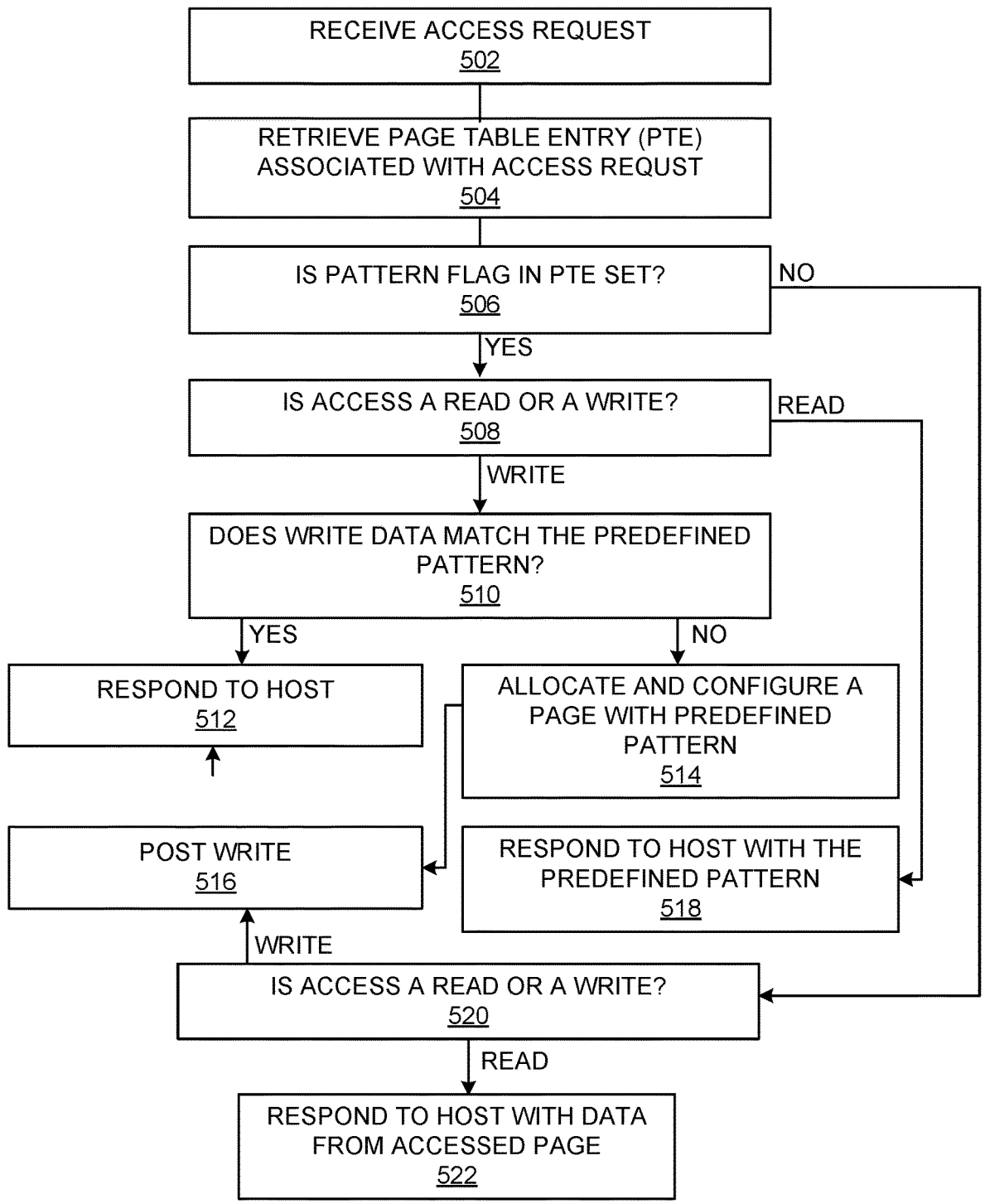
FIG. 5 is a flowchart illustrating a method of accessing memory that may be compressed.

FIG. 5 is a flowchart illustrating a method of accessing memory that may be compressed. One or more steps illustrated in FIG. 5 may be performed by, for example, system 100, and/or its components. An access request is received (502). For example, memory node 140 may receive a request from system node 190 to access a cache line sized block of information stored in memory devices 120.

The page table entry associated with the access request is retrieved (504). For example, page table walker 152 may retrieve, from page table 125, a page table entry 126a-127a associated with the access request from system node 190. It is determined whether the pattern flag in the page table entry is set (506). If the pattern flag in the retrieved page table entry 126a-127a is set, flow proceeds to block 508. If the pattern flag in the retrieved page table entry 126a-127a is not set, flow proceeds to block 520. In block 520, it is determined whether the access is a read or a write (520). If the access is a read, flow proceeds to block 522. If the access is a write, flow proceeds to block 516. In block 522, a response to host with data from the accessed page is provided (522). In block 516, the write is posted (516). Flow then proceeds to block 512 where a response indicating the write was posted is provided (512).

If the pattern flag was set, in block 508, it is determined whether the access was a read or a write (508). If the access was a read, flow proceeds from block 508 to block 518. In block 518, the predefined pattern is provided to the host (518). For example, buffer device 150 may provide the predefined pattern to system node 190 without accessing the page in memory devices 120 associated with the read request. If the access was a write, flow proceeds from block 508 to block 510. In block 510, it is determined whether the write data matches the predefined pattern (510). If the write data matches the predefined pattern, a response is provided to the host (512). If the write data does not match the predefined pattern, a page is allocated and configured with the predefined pattern (514). For example, buffer device 150 may allocate a page (e.g., unallocated page 123) and write the predefined pattern to all of the cache lines in that page. In another example, buffer device 150 may allocate a page (e.g., unallocated page 123) and write the predefined pattern to all of the cache lines in that page except the cache line that was the target of the write.

Figure 6:
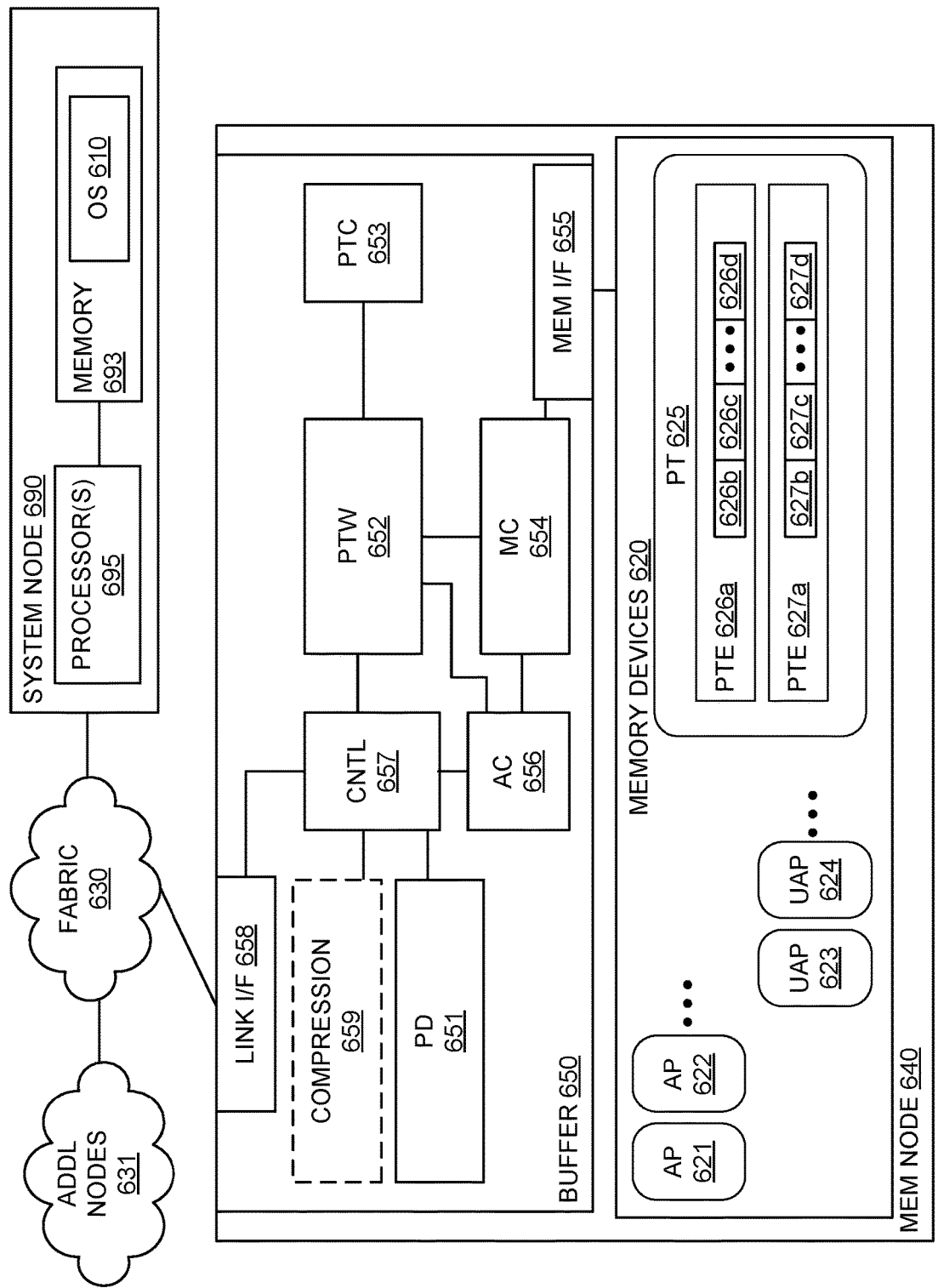
FIG. 6 is an illustration of a system that can reduce memory device accesses.

FIG. 6 is an illustration of a system that can reduce memory device accesses. In FIG. 6, system 600 comprises system node 690, fabric 630, additional nodes 631, and memory node 640. System node 690 includes processor(s) 695, and local processor memory 693. Local processor memory 693 may store an operating system 610 that is executing on one or more processors 695. Memory node 640 includes buffer device 650, and memory devices 620. Memory devices 620 may store allocated pages 621-622, unallocated pages 623-624, and page table 625. Page table 625 may include page table entries 626a-627a. Page table entry 626a may include cache line pattern flags 626b-626d. Page table entry 627a may include cache line pattern flags 627b-627d. Page table entry 626a may be associated with allocated page 621. Page table entry 627a may be associated with allocated page 622.

System node 690, memory node 640, and additional nodes 631 are operatively coupled to fabric 630. System node 690, memory node 640, and additional nodes 631 are operatively coupled to fabric 630 to communicate and/or exchange information etc. with each other. Fabric 630 may be or comprise a switched fabric, point-to-point connections, and/or other interconnect architectures (e.g., ring topologies, crossbars, etc.) Fabric 630 may include links, linking, and/or protocols that are configured to be cache coherent. For example, fabric 630 may use links, linking, and/or protocols that include functionality described by and/or are compatible with one or more of Compute Express Link (CXL), Coherent Accelerator Processor Interface (CAPI), and Gen-Z standards, or the like. In an embodiment, system node 690, memory node 640, and additional nodes 631 are operatively coupled to fabric 630 to request and/or store information from/to that resides within other of system node 690, memory node 640, and/or additional nodes 631. In an embodiment, additional nodes 631 may include similar or the same elements as system node 690, and/or memory node 640 and are therefore, for the sake of brevity, not discussed further herein with reference to FIG. 6.

In an embodiment, buffer device 650 includes page table walker (PTW) 652, page table control 653, memory controller 654, memory interface 655, allocation control 656, control circuitry 657, link control 658, and link interface 659. Page table walker 652 is operatively coupled to page table control 653, memory controller 654, allocation control 656, and control circuitry 657. Memory controller is operatively coupled to memory interface 655. Memory interface 655 is operatively coupled to memory devices 620. Memory interface 655 is configured to access at least one of memory devices 620 to access allocated pages 621-622, unallocated pages 623-624, and page table 625 stored by memory devices 620.

Control circuitry 657 is operatively coupled to page table walker 652, allocation control 656 and link control 658. Link control 658 is operatively coupled to link interface 659. Link interface 659 is operatively coupled to fabric 630. Link interface 659 is operatively coupled to fabric 630 to receive, from processor 695 executing operating system 610, access requests (e.g., reads and writes).

Access requests transmitted by system node 690 may include read requests (e.g., to read a cache line sized block of data) and write requests (e.g., to write a cache line sized block of data). To respond to the read or write request, buffer device 650 (and PTW 652, in particular) may perform a page table walk of page table 625 to relate the addressed received from processor 695 to a physical address of a cache line sized block of data in an allocated page 621-622 that is used by memory devices 620. In addition to receiving a physical address from a page table entry 626a-627a in page table 625, buffer receives cache line pattern flags 626b-626d, 627b-627d, respectively. Each cache line pattern flag 626b-626d, 627b-627d is an indicator of whether a corresponding block of memory (e.g., cache line sized block, multiple cache line sized, page sized, mulitple page size, etc.) in the associated block of memory (e.g., page 621-622) is storing a predefined pattern (e.g., all zeros). Thus, for example, if each page 621-622 is 4 kilobytes in size and stores 64 cache lines of 64 bytes each, there would be 64 cache line pattern flags 626b-626d, 627b-627d in each page table entry 626a-627a. Each cache line pattern flag 626b-626d, 627b-627d would indicate whether the corresponding cache line in the associated page 621-622 is storing the pattern. In another example, if each page 621-622 is 4 kilobytes in size and stores 64 cache lines of 64 bytes each and there are only be 16 cache line pattern flags 626b-626d, 627b-627d in each page table entry 626a-627a. Each cache line pattern flag 626b-626d, 627b-627d would indicate whether the corresponding group of four (4) cache lines in the associated page 621-622 is storing the pattern.

To maintain cache line pattern flags, buffer device 150 would track write requests of the cache line sized blocks to each page 621-622 and update the corresponding cache line pattern flag 626b-626d, 627b-627d according to whether or not the cache line data matched the predefined pattern. Thus, if all of the cache line pattern flags 626b-626d, 627b-627d for a page 621-622 indicated all of the contents of the page 621-622 matched the pattern, the page could be deallocated. Reads from the deallocated page could be returned to system node using the predefined pattern without having to access the page in memory device 620. Similarly, whether or not all of the page is storing the predefined pattern, read results of a cache line sized block of data with a cache line pattern flag 626b-626d, 627b-627d indicating that it matches the predefined pattern could be returned to system node using the predefined pattern without having to access the page in memory device 620.

In FIG. 6, page table 625 is depicted as residing in the same memory devices 620 as allocated pages 621-622 and unallocated pages 623-624. However, this is merely one embodiment selected for illustration purposes. Page table 625 may reside in other memory. For example, all or parts of page table 625 may reside in dedicated memory device(s) (e.g., dedicated SRAM), in memory in buffer 650, and/or in a page table cache in buffer 650.

Figure 7:
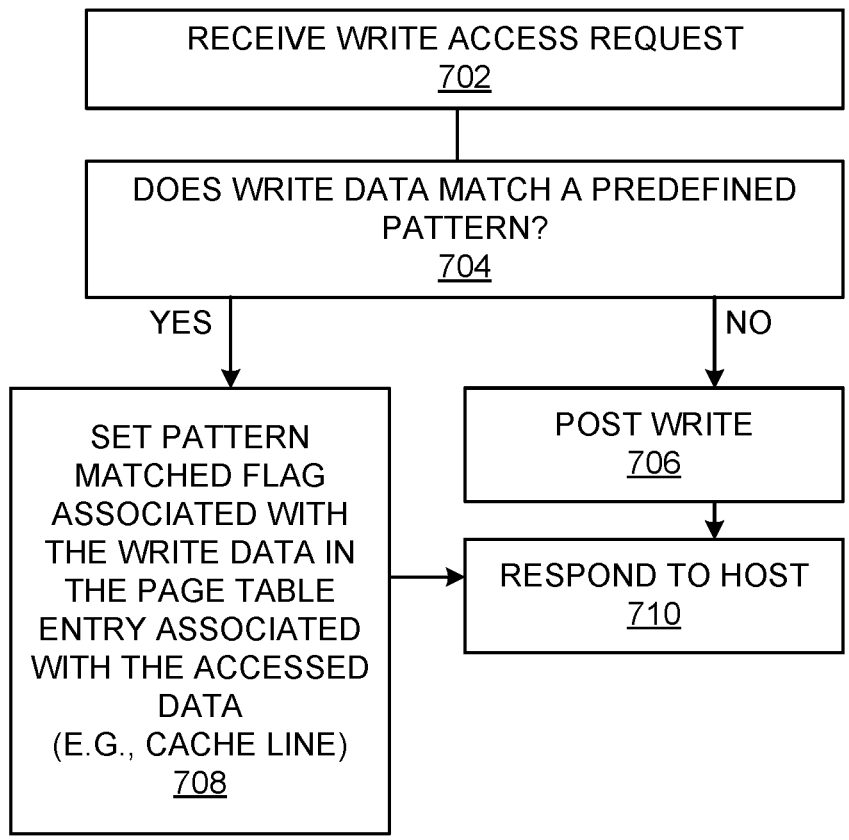
FIG. 7 is a flowchart illustrating a method of writing to memory.

FIG. 7 is a flowchart illustrating a method of writing to memory. One or more steps illustrated in FIG. 7 may be performed by, for example, system 100, system 600, and/or their components. A write access is received (702). For example, memory node 640, (and buffer device 650, in particular) may receive a request from system node 690 to write a cache line of data to page 622.

It is determined whether the write data of the write request matches a predefined pattern (704). For example, control circuitry 657 may compare write data associated with the received write request to a predefined pattern (e.g., all zeroes). If the write data of the write request matches the predefined pattern, flow proceeds to block 708. If the write data of the write request does not match the predefined pattern, flow proceeds to block 706. In block 706, the write is posted and flow continues to block 710. In block 708, a pattern matched flag associated with the write data is set in the page table entry associated with the accessed data. For example, page table control 653 may, in response to an indicator from control circuitry 657, set the cache line pattern flag 627b-627d in page table entry 627a associated with the cache line sized block of data being written to page 622. Buffer device 650 may set the cache line pattern flag 627b-627d in page table entry 627a associated with the cache line sized block of data being written to page 622 without actually writing the predefined pattern to page 622.

Figure 8:
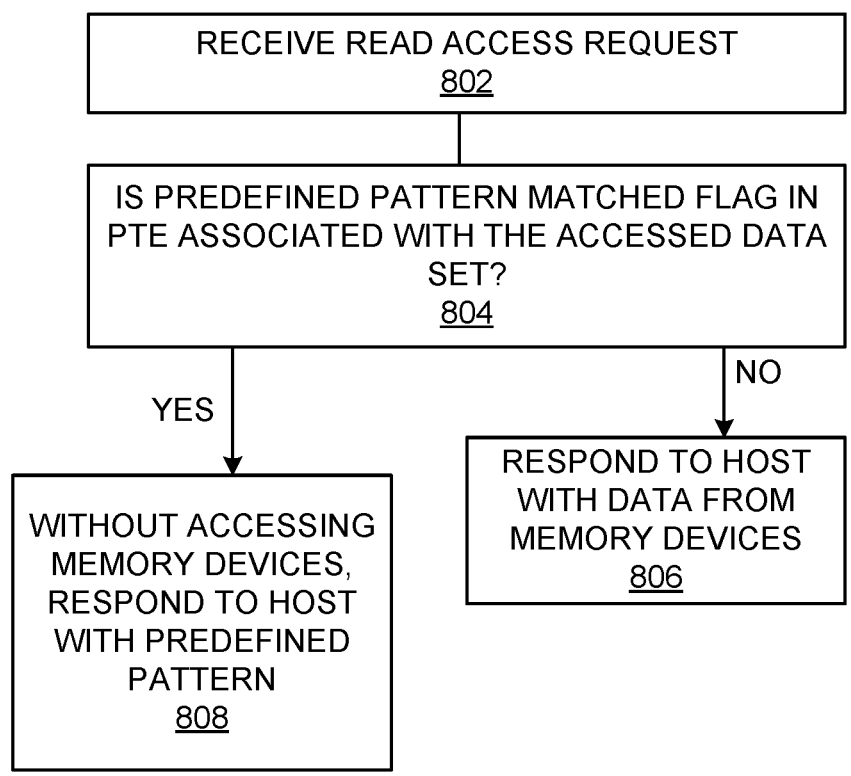
FIG. 8 is a flowchart illustrating a method of reading memory.

FIG. 8 is a flowchart illustrating a method of reading memory. One or more steps illustrated in FIG. 8 may be performed by, for example, system 100, system 600, and/or their components. A read access is received (802). For example, memory node 640, (and buffer device 650, in particular) may receive a request from system node 690 to read a cache line of data from page 622.

It is determined whether the predefined pattern matched flag in the page table entry associated with the accessed data is set (804). For example, in response to the read request, page table walker 652 may walk page table 625 and retrieve page table entry 627a which includes cache line pattern flags 627b-627d. The value of the cache line pattern flag 627b-627d that is associated with the data being read may be evaluated to determine whether it is set (indicating the corresponding data matches the predefined pattern) or not (indicating the corresponding data does not match the predefined pattern). If the pattern matched flag does not indicate the corresponding data matches the pattern, flow proceeds to block 806.

In block 806, the response to the host is data from the memory devices (806). For example, if the value of the cache line pattern flag 627b-627d that is associated with the data being read indicates the corresponding data does not match the predefined pattern, buffer device 650 may access page 622 in memory devices 620 to supply the requested read data to system node 690. In block 808, the response to the host is, without accessing the memory device, the predefined pattern (808). For example, if the value of the cache line pattern flag 627b-627d that is associated with the data being read indicates the corresponding data does matches the predefined pattern, buffer device 650 may supply the predefined pattern to system node 690 without reading it from page 622 in memory device 620.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 600, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3-½ inch floppy media, CDs, DVDs, and so on.

Figure 9:
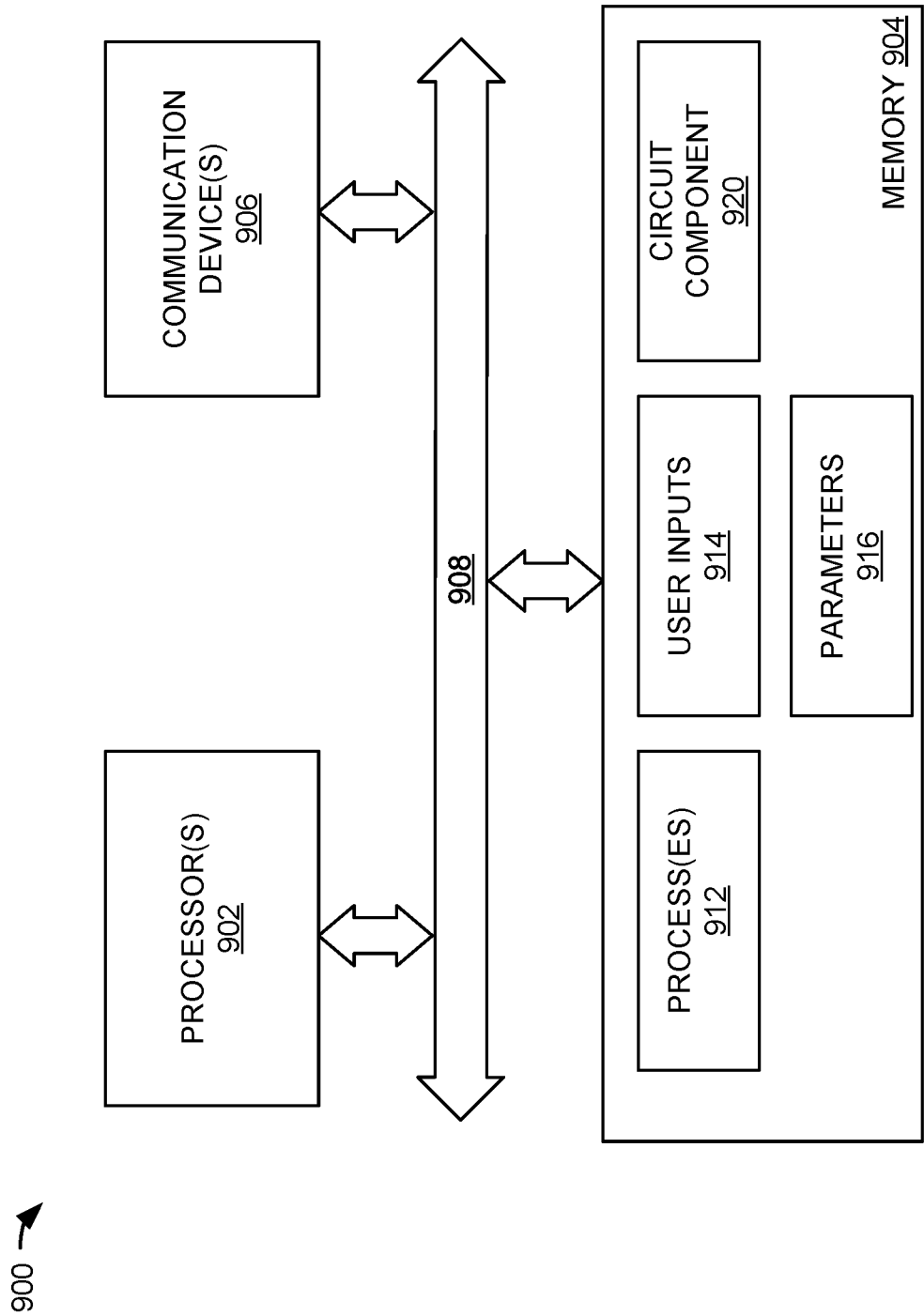
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of system 100, system 600, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: An integrated circuit, comprising: memory allocation circuitry to allocate a first block of physical memory; pattern detection circuitry to identify that data stored in the first block of physical memory matches a first pattern; memory deallocation circuitry to, based on the first block of physical memory matching the first pattern, deallocate the first block of physical memory; indicator setting circuitry to, based on the first block of physical memory matching the first pattern, set a first indicator in a page table structure to indicate the first block of physical memory matched the first pattern; and read access circuitry to, based on a read access addressed to the first block of physical memory and the first indicator, provide the first pattern in response to the read access.

Example 2: The integrated circuit of example 1, wherein the pattern detection circuitry identifies that data stored in the first block of physical memory matches the first pattern during a compression operation being performed on the first block of physical memory.

Example 3: The integrated circuit of example 1, wherein the pattern detection circuitry identifies that data stored in the first block of physical memory matches the first pattern during a maintenance operation being performed on the first block of physical memory.

Example 4: The integrated circuit of example 1, wherein the pattern detection circuitry monitors write accesses addressed to the first block of physical memory to identify that data stored in the first block of physical memory matches the first pattern.

Example 5: The integrated circuit of example 1, wherein the page table structure comprises a first level page table entry associated with a plurality of second level page table entries, the plurality of second level page table entries each associated with respective ones of a plurality of blocks of physical memory, the first level page table entry including a second indicator to indicate that each of the a plurality of blocks of physical memory match the first pattern.

Example 6: The integrated circuit of example 1, wherein the first block of physical memory comprises a plurality of cache line sized blocks of physical memory, and the page table structure comprises a last level page table entry having a corresponding plurality of indicators identifying which of the plurality of cache line sized blocks of physical memory match the first pattern.

Example 7: The integrated circuit of example 6, wherein the pattern detection circuitry uses the plurality of indicators identifying which of the plurality of cache line sized blocks of physical memory match the first pattern to identify whether the first block of physical memory matches the first pattern.

Example 8: The integrated circuit of example 1, wherein the pattern detection circuitry is to also identify that data stored in a second block of physical memory matches a second pattern.

Example 9: An integrated circuit, comprising: a page table manager to manage and access a page table; and read access circuitry to, based on a first indicator in the page table, provide a first data pattern in response to a first read access request.

Example 10: The integrated circuit of example 9, further comprising: pattern detection circuitry to identify whether a first block of physical memory is only storing a plurality of copies of the first data pattern.

Example 11: The integrated circuit of example 10, wherein, in response to the pattern detection circuitry identifying that the first block of physical memory is only storing the plurality of copies of the first data pattern, the page table manager deallocates the first block of physical memory and sets a first indicator in the page table to indicate that read accesses addressed to the first block of physical memory should be provided the first data pattern.

Example 12: The integrated circuit of example 10, further comprising: write access circuitry to identify when a write access addressed to the first block of physical memory will result in an address range associated with the first block of physical memory no longer only storing the plurality of copies of the first data pattern.

Example 13: The integrated circuit of example 12, wherein, in response to the write access circuitry identifying the address range associated with the first block of physical memory no longer only storing the plurality of copies of the first data pattern, the page table manager allocates a second block of physical memory and configures the second block of physical memory with the first data pattern.

Example 14: The integrated circuit of example 13, further comprising compression circuitry to compress the first block of physical memory and accesses to provide the compression circuitry with data from the first block of physical memory are used by the pattern detection circuitry to identify whether the first block of physical memory is only storing the plurality of copies of the first data pattern.

Example 15: A method, comprising: identifying that a first block of physical memory is only storing a plurality of copies of a first data pattern; based on the first block of physical memory only storing a plurality of copies of the first data pattern, deallocating the first block of physical memory; and based on the first block of physical memory only storing a plurality of copies of the first data pattern, setting a first indicator in a page table to indicate that read accesses addressed to the first block of physical memory should be provided the first data pattern.

Example 16: The method of example 15, further comprising: based on the first indicator in the page table, providing the first data pattern in response to a first read access request.

Example 17: The method of example 16, further comprising: identifying when a write access addressed to the first block of physical memory will result in an address range associated with the first block of physical memory no longer only storing the plurality of copies of the first data pattern.

Example 18: The method of example 17, further comprising: based on identifying that the address range associated with the first block of physical memory will no longer be only storing the plurality of copies of the first data pattern, allocating a second block of physical memory.

Example 19: The method of example 17, further comprising: based on identifying that the address range associated with the first block of physical memory will no longer be only storing the plurality of copies of the first data pattern, configuring a second block of physical memory with the first data pattern.

Example 20: The method of example 19, further comprising: compressing the second block of physical memory.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
   memory allocation circuitry to allocate a first block of physical memory;
   pattern detection circuitry to identify that data stored in the first block of physical memory is only storing a plurality of copies of a first data pattern;
   memory deallocation circuitry to, based on the first block of physical memory only storing the plurality of copies of the first data pattern, deallocate the first block of physical memory;
   indicator setting circuitry to, based on the first block of physical memory only storing the plurality of copies of the first data pattern, set a first indicator in a page table structure to indicate the first block of physical memory is only storing the plurality of copies of the first data pattern; and read access circuitry to, based on a read access addressed to the first block of physical memory and the first indicator, provide the first data pattern in response to the read access.

2. The integrated circuit of claim 1, wherein the pattern detection circuitry identifies that data stored in the first block of physical memory is only storing the plurality of copies of the first data pattern during a compression operation being performed on the first block of physical memory.

3. The integrated circuit of claim 1, wherein the pattern detection circuitry identifies that data stored in the first block of physical memory is only storing the plurality of copies of the first data pattern during a maintenance operation being performed on the first block of physical memory.

4. The integrated circuit of claim 1, wherein the pattern detection circuitry monitors write accesses addressed to the first block of physical memory to identify that data stored in the first block of physical memory is only storing the plurality of copies of the first data pattern.

5. The integrated circuit of claim 1, wherein the page table structure comprises a first level page table entry associated with a plurality of second level page table entries, the plurality of second level page table entries each associated with respective ones of a plurality of blocks of physical memory, the first level page table entry including a second indicator to indicate that each of the plurality of blocks of physical memory are only storing the plurality of copies of the first data pattern.

6. The integrated circuit of claim 1, wherein the first block of physical memory comprises a plurality of cache line sized blocks of physical memory, and the page table structure comprises a last level page table entry having a corresponding plurality of indicators identifying which of the plurality of cache line sized blocks of physical memory match the first data pattern.

7. The integrated circuit of claim 6, wherein the pattern detection circuitry uses the plurality of indicators identifying which of the plurality of cache line sized blocks of physical memory match the first data pattern to identify whether the first block of physical memory is only storing the plurality of copies of the first data pattern.

8. The integrated circuit of claim 1, wherein the pattern detection circuitry is to also identify that data stored in a second block of physical memory is only storing a plurality of copies of a second data pattern.

9. An integrated circuit, comprising:
a page table manager to manage and access a page table with page table entries each associated with a respective one of each of a plurality of blocks of memory; and
read access circuitry to, based on a first indicator in the page table, provide a first data pattern in response to a first read access request, where the first data pattern is a one of a plurality of copies of the first data pattern being stored by a first one of the plurality of blocks of memory associated with the read access by the page table.

10. The integrated circuit of claim 9, further comprising:
pattern detection circuitry to identify that the first block of memory is only storing a plurality of copies of the first data pattern.

11. The integrated circuit of claim 10, wherein, in response to the pattern detection circuitry identifying that the first block of memory is only storing the plurality of copies of the first data pattern, the page table manager deallocates a first block of physical memory and sets a first indicator in the page table to indicate that read accesses addressed to the first block of physical should be provided the first data pattern.

12. The integrated circuit of claim 10, further comprising:
write access circuitry to identify when a write access addressed to the first block of memory will result in an address range associated with the first block of memory no longer only storing the plurality of copies of the first data pattern.

13. The integrated circuit of claim 12, wherein, in response to the write access circuitry identifying the address range associated with the first block of memory no longer only storing the plurality of copies of the first data pattern, the page table manager allocates a second block of physical memory and configures the second block of physical memory with the plurality of copies of the first data pattern.

14. The integrated circuit of claim 13, further comprising compression circuitry to compress the first block of physical memory and accesses to provide the compression circuitry with data from the first block of physical memory are used by the pattern detection circuitry to identify that the first block of physical memory is only storing the plurality of copies of the first data pattern.

15. A method, comprising:
identifying that a first block of memory associated with a first block of physical memory by a page table is only storing a plurality of copies of a first data pattern;
based on the first block of memory only storing the plurality of copies of the first data pattern, deallocating the first block of physical memory; and
based on the first block of memory only storing the plurality of copies of the first data pattern, setting a first indicator in the page table to indicate that read accesses addressed to the first block of memory should be provided the first data pattern.

16. The method of claim 15, further comprising:
based on the first indicator in the page table, providing the first data pattern in response to a first read access request.

17. The method of claim 16, further comprising:
identifying when a write access addressed to the first block of memory will result in an address range associated with the first block of memory no longer only storing the plurality of copies of the first data pattern.

18. The method of claim 17, further comprising:
based on identifying that the address range associated with the first block of memory will no longer be only storing the plurality of copies of the first data pattern, allocating a second block of physical memory.

19. The method of claim 17, further comprising:
based on identifying that the address range associated with the first block of memory will no longer be only storing the plurality of copies of the first data pattern, configuring a second block of physical memory with the plurality of copies of the first data pattern.

20. The method of claim 19, further comprising:
compressing the second block of physical memory.

* * * * *